March 14, 1967
G. MARIER
3,309,150
SNOWMOBILE SUSPENSION
Filed Sept. 21, 1964
2 Sheets-Sheet 1
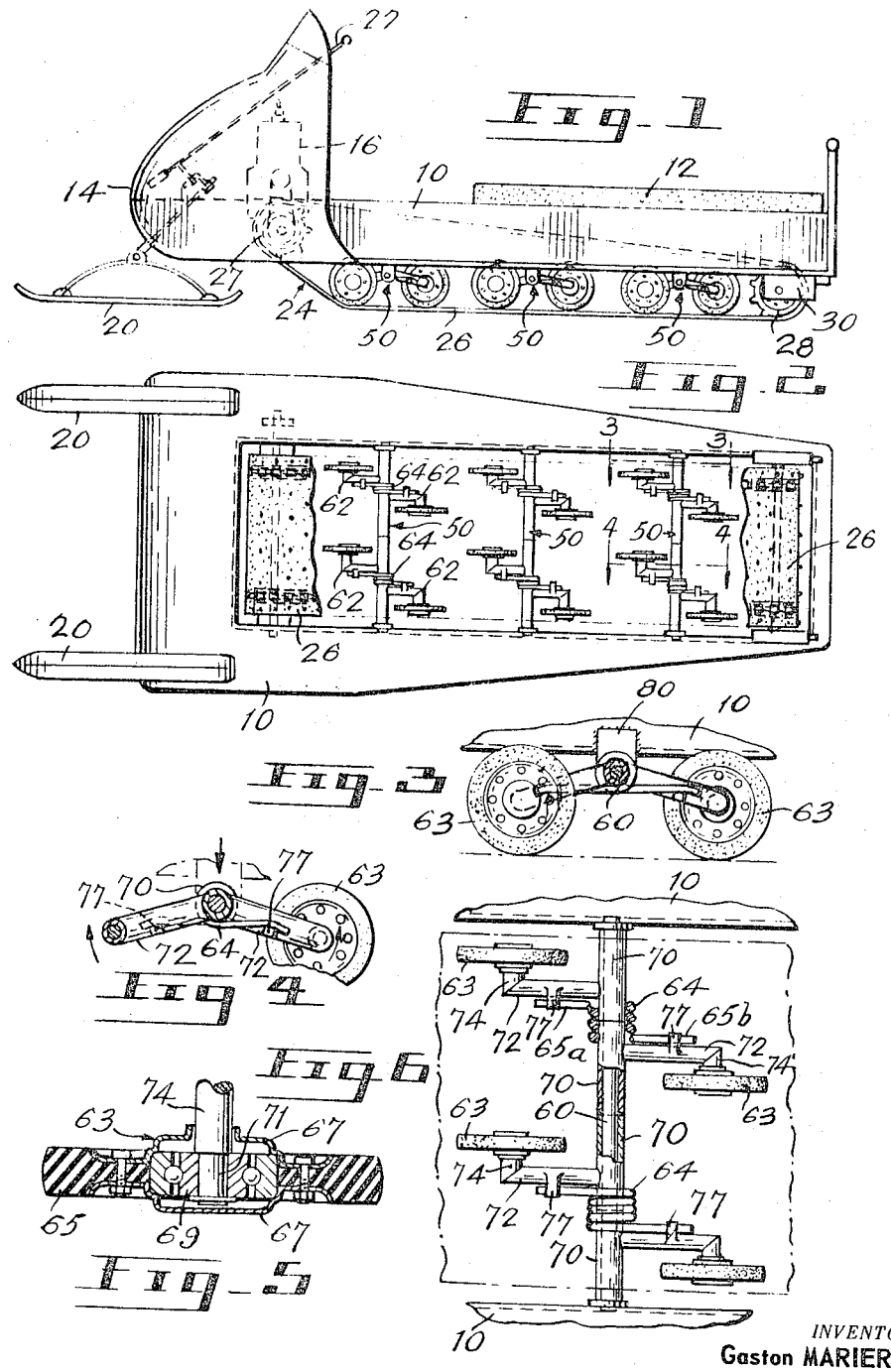
INVENTOR
Gaston MARIER
BY
ATTORNEY March 14, 1967  G. MARIER  3,309,150
SNOWMOBILE SUSPENSION
Filed Sept. 21, 1964  2 Sheets-Sheet 2

INVENTOR
Gaston MARIER

ATTORNEY

United States Patent Office 3,309,150
Patented Mar. 14, 1967

3,309,150
SNOWMOBILE SUSPENSION
Gaston Marier, Montreal, Quebec, Canada
(1819 Rue Capitol, Laval, Montreal, Quebec, Canada)
Filed Sept. 21, 1964, Ser. No. 397,842
3 Claims. (Cl. 305—27)

The present invention relates to improvements in the construction of relatively small motor driven vehicles of the type utilized mainly for travel over snow or ice wherein the main driving and supporting element is an endless track or belt which is supported on a resiliently biased suspension system for a direct drive from toothed sprockets connected to an internal combustion engine.

These vehicles, generally known as extra light tractors or snowmobiles, consist essentially of an open light chassis or frame adapted to accommodate one or two persons which is supported by a front steering system, usually consisting of short skis or skids controlled by a steering shaft, and the above mentioned resiliently suspended endless track which extends along beneath a major portion of the chassis. In order that the endless track be kept in alignment and driven it is usually provided with two parallel rows of sprocket tooth accommodating openings one along each side which are engaged by the spaced driving sprocket teeth at one end and by a similar set of idler sprockets at the other. With this arrangement it is necessary to support the intervening portion of the track on resiliently biased rollers both longitudinally and transversely so that it is maintained with its driving surface substantially parallel to the lower surface of the chassis and flat to give maximum traction. Since these vehicles are of relatively light and simple construction it is necessary that the track suspension system be as simple and compact as possible while providing the necessary resilient action.

In accordance with the present invention this is accomplished by providing means for supporting a plurality of track supporting wheels or rollers beneath the chassis for independent individual or twinned resilient action on bearing shafts which are suspended beneath the vehicle chassis. More specifically, in the preferred construction the individual wheels are supported for rotation at the end of a lever arm with the lever arm in turn being provided with a bearing sleeve fitting over the bearing shaft so that each lever arm is capable of free pivotal movement about the shaft. The bearing sleeve-lever arm assemblies are mounted on each shaft in tandem alignment so that each alternate assembly is opposed to the adjacent assembly and a single torsion spring is mounted over the bearing sleeves of the adjacent assemblies in such a manner that the opposite ends of the spring are connected to and resiliently bias each opposing pair of lever arms so that the wheels mounted therein are normally urged outwards in spaced alignment towards the inner surface of the endless track. It should be mentioned that each lever arm is provided with an offset extension on the end supporting the wheel and the wheel is mounted directly on the end of this extension so that it is offset from and parallel to the lever arm. When the lever arms are assembled to the bearing shaft in opposing pairs as described, the offset of one lever arm plus the offset of the adjacent lever arms places the wheels in spaced apart alignment relative to the axis of the bearing shaft and in offset relationship relative to the run of the track so as to provide resilient rolling support at two points.

With this arrangement similar suspension system can be arranged for any desired width of length of endless track by selecting bearing shafts of the correct length and mounting the required number of pairs of bearing sleeve-lever arm assemblies to the shaft as described to suit the width and supplying as many shafts as necessary in spaced relationship along the length of the chassis to support similar wheel supporting assemblies.

Having thus generally described the nature of the invention, particular reference will be made to the accompanying drawings showing by way of illustration a preferred embodiment thereof, and in which:

FIGURE 1 is a somewhat diagrammatic view in side elevation of a snowmobile construction embodying an endless track resilient suspension system in accordance with the invention.

FIGURE 2 is a bottom plan view of the construction shown in FIGURE 1 with the endless track deleted to show one preferred form of the suspension more clearly.

FIGURE 3 is an enlarged detail view partially in section of a typical section of the suspension system shown in FIGURE 2 as seen along the line 3—3.

FIGURE 4 is an enlarged detail view partially in section of a typical section of the suspension system shown in FIGURE 2 as seen along the line 4—4.

FIGURE 5 is a greatly enlarged sectional view of one of the system wheel assemblies showing a preferred method of mounting to the lever arm extension end.

FIGURE 6 is an enlarged partial view in plan partially in section of one complete wheel assembly mounted on a bearing shaft.

Figure 7:
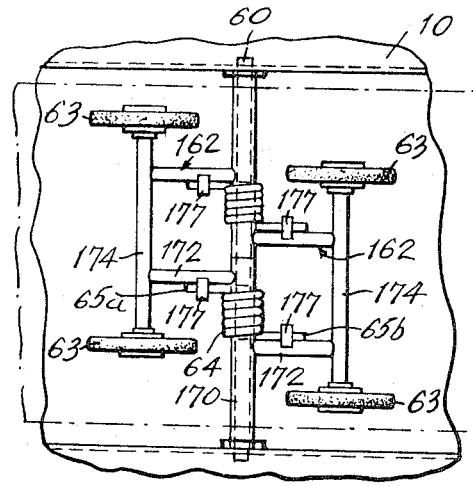
FIGURE 7 is an enlarged partial view corresponding to FIGURE 6 to illustrate an alternative construction embodying combined twin wheel supporting assemblies as they would appear on a supporting shaft.

With particular reference to FIGURES 1 and 2 of the drawings, there is shown by way of an example a snowmobile construction embodying the resilient track suspension system of the invention. This vehicle consists essentially of a light chassis or frame 10 in which there is mounted a flat seat 12 and a partial body 14, preferably of reinforced glass fibers or the like which acts as a windshield support and protection for the operator as well as a housing for a relatively small internal combustion engine 16. This chassis 10 is mounted on and is supported for travel by a pair of spaced apart relatively short skis 20 which are coupled for steering and controlled by a control stick 22, and an endless track assembly 24. The endless track assembly 24 includes a single endless track 26 having at each side a plurality of sprocket tooth receiving openings which are engaged by a pair of driving sprockets 27 connected directly to the engine 16 and a pair of idler sprockets 28 which are mounted on an adjustable track tensioning assembly 30.

In accordance with the present invention the lower and driving run of the track 26, and consequently the chassis 10, is supported by a plurality, in the construction illustrated three (3), of resiliently biased wheel supporting assemblies 50 which are constructed so that the major portion of the inner surface of the track 26 during its driving run is backed up by a plurality of wheels in order to maintain the alignment of the track, prevent deformation of the track and of course to resiliently support the vehicle in order to cushion the ride. The main feature of the suspension assemblies 50 is that each is made up of identical components which in one preferred construction shown in FIGURES 2 through 5, consist of a main bearing shaft 60, a combined bearing sleeve-lever arm assembly 62 including a wheel 63, and a torsion spring 64. These elements are combined to provide any desired length (with respect to the width of the track) of suspension assembly. In the construction illustrated four (4) sets of assemblies 62 are mounted on each bearing shaft 60 and each set is resiliently biased by two (2) torsion springs 64.

As shown most clearly in FIGURE 6 for example, each assembly 62 is made up of tubular steel welded together to provide a bearing sleeve 70, a lever arm 72 extending at substantially right angles to the sleeve 70 and a lever arm extension 74 extending at substantially right angles to the lever arm 72. Each wheel 63 in the preferred construction, consists of a resilient body 65 secured between hub plates 67 with an internal bearing 69 fitting over a stub shaft 71 mounted in the end of the lever arm extension 74. It will also be noted that the lever arm 72 extends from the bearing sleeve 70 at a position offset from the longitudinal centre line so that each assembly bearing sleeve 70 has a long end and a short end relative to the lever arm. This spacing is calculated so that when the assemblies 62 are mounted on the shaft 60 the spacing between the wheels 63 is substantially the same relative to the width of the track. In other words, the sum of the length of two adjacent "long ends" of the bearing sleeve is substantially equal to the distance between each pair of wheels 63 extending from the lever arms 72 located adjacent the "short ends" of the bearing sleeves.

On assembly, the assemblies 62 are mounted in sequence to the bearing shaft 60 with a torsion spring 64 mounted over the adjacent "short ends" of each pair of assemblies. The ends 65a, 65b of the spring 64 are engaged with the lugs 77 extending from the lever arms 72 so that each pair is resiliently biased downwardly in opposed relationship as shown in FIGURE 4. The next pair are assembled in a similar manner and then the entire unit is mounted to the chassis by the securing of the ends of the shaft 60 to shaft supports 80 extending from the chassis frame 10. In the construction shown there are three (3) such assemblies utilized to provide the necessary resilient suspension for the track 26. As will be obvious, by reference to the preceding description and accompanying drawings, this preferred arrangement provides an individual resilient suspension to each of the wheels 63 permitting them to resiliently flex up or down separately when the track 26 is passing over rough terrain.

Figures 8, 9:
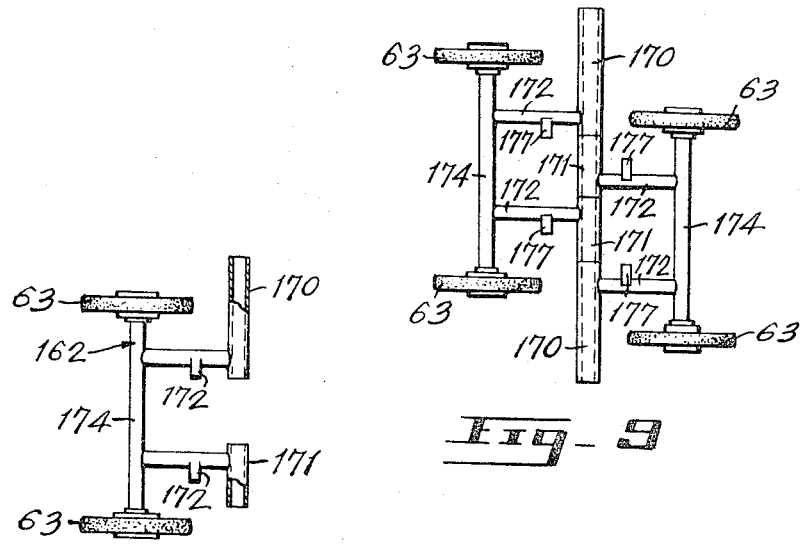
FIGURE 8 is a detail view of one twin wheel supporting assembly as shown in FIGURE 7.
FIGURE 9 is an enlarged detail view of two aligned twin wheel supporting assemblies as shown in FIGURE 7 with the torsion springs omitted for clarity.

In the construction shown in FIGURES 7 through 9 illustrating a preferred alternate construction the wheels 63 are supported in pairs or "twin" assemblies so as to provide a somewhat less flexible yet equally effective suspension arrangement wherein only two (2) identical bearing sleeve-lever arm assemblies 162 are utilized to support the four wheels extending across the track on each bearing shaft 60. In this arrangement, the wheels 63 are mounted in pairs, one at each end of a common support 174 with lever arms 172 extending from the support 174 to sleeve bearings 170, 171. As shown most clearly in FIGURE 8, for example, the assemblies 162 are again identical, with the bearing sleeve 170 being longer than the bearing sleeve 171 with the spacing between the inner ends of the sleeves being slightly greater than the length of the shorter sleeve 171 so that when two or more assemblies 162 are mounted on the shaft 60 in opposed relationship the bearing sleeves align with each other forming a substantially continuous sleeve the length of the shaft, as shown in FIGURE 9. It will be noted that the lever arms 172 are each provided with spring engaging lugs 177 so that when torsion springs 64 are mounted over the bearing sleeves, as shown in FIGURE 7, the ends 65a, 65b are engaged with the lugs 177 to resiliently bias the assemblies 162 in opposite directions as previously described.

It will be obvious that there are many advantages in the present suspension system to the manufacturer. The use of single basic units 62 or 162 make it possible to manufacture these in production quantities prior to the assembly of the vehicle and then merely select the quantity and type desired to suit any particular wheel track. Since in the preferred forms the bearing axles 60 and torsion springs 64 are also standard units, repairs and maintenance are also greatly simplified. If in the course of use, one or more bearing assemblies are deformed or damaged, it is a simple matter to pull these off the shaft 60 and replace them with a new unit without the necessity of any fitting or elaborate dismantling.

This suspension is specially designed for a snowmobile having a transmission with a reverse gear, and all the suspension units as previously described can work even in forward and backward position.

I claim:

1. In an endless track vehicle, an endless flexible belt having a flat inner surface and upper and lower vertically spaced runs, a suspension assembly having resilient biased rolling support on the lower inner surface of said endless belt, said suspension assembly comprising a main bearing shaft mounted beneath said vehicle transversely above the lower inner surface of said endless belt, a plurality of wheel-supporting assemblies mounted on said shaft, each wheel-supporting assembly having bearing sleeve means journaled on said shaft, said bearing sleeve means comprising a plurality of colinear tubular sleeve sections extending the length of said shaft, said bearing sleeve means being disposed in opposed pairs longitudinally of said endless belt and on opposite sides of the midpoint of said shaft with adjacent ends of said sleeve sections being in substantially abutting, coaxial engagement, a lever arm extending from an intermediate portion of each of the respective sleeve sections and spaced inwardly from the outer edge of said flexible belt, said lever arms terminating in at least one lateral axle, at least one wheel journaled on each lateral axle, and at least a pair of torsion springs each circumposed about abutting ends of the sleeve sections and including oppositely directed end portions extending along said respective levers, said levers including lateral abutment portions engaged by the respective ends of said torsion springs, said wheels being transversely spaced with respect to each other and disposed in pairs on opposite sides of the longitudinal center of said endless belt, each of said wheel-supporting assemblies being identical and interchangable.

2. The structure as claimed in claim 1 in which the lateral axle of pairs of wheels forwardly and rearwardly of said main bearing shaft are integrally connected to each other.

3. The structure as claimed in claim 1 in which said wheel assemblies are each independently journaled on said main bearing shaft.

References Cited by the Examiner
UNITED STATES PATENTS 2,355,266  8/1944  Bombardier _____ 305—23 X
3,023,824  3/1962  Bombardier _____ 305—27 X

FOREIGN PATENTS 146,854  8/1936  Austria.

BENJAMIN HERSH, Primary Examiner.

LEO FRIAGLIA, Examiner.

R. A. JOHNSON, Assistant Examiner.